Nov. 30, 1943.         S. SLAUBAUGH              2,335,364
                     GRAIN MEASURING DEVICE
                     Filed March 28, 1940         2 Sheets-Sheet 1

Inventor
Simon Slaubaugh.
By Raymond J. Norton
Attorney

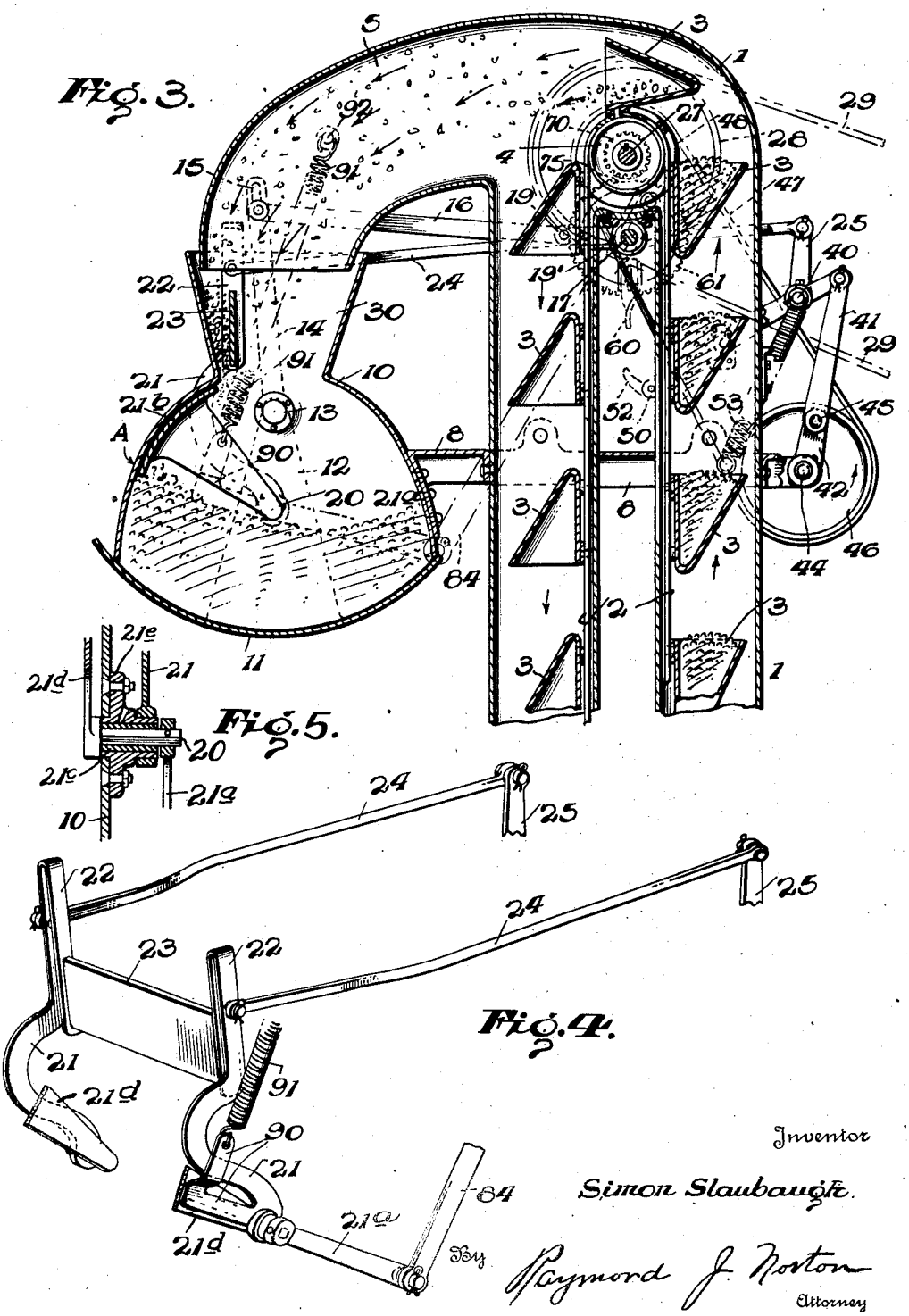

Patented Nov. 30, 1943

2,335,364

UNITED STATES PATENT OFFICE 2,335,364

GRAIN MEASURING DEVICE

Simon Slaubaugh, Wolford, N. Dak.

Application March 28, 1940, Serial No. 326,508

4 Claims. (Cl. 73—223)

This invention relates to an improved apparatus for automatically measuring granular material such as grain.

The invention comprehends the utilization of a simple rugged structure which may readily be attached to a conveyor on a threshing machine or combine and which, in operation, serves automatically to measure the grain and tally the bushels.

In order more clearly to explain the invention a preferred physical embodiment is shown for illustrative purposes in the accompanying drawings in which:

Figure 3 is a sectional view through the upper head of the harvester conveyor on line 3—3 of Figure 1 looking in the direction of the arrows.

Figure 4 is a detailed perspective view of the stroker mechanism.

Figure 5 is a detailed view of a section of the apparatus.

Figure 1:
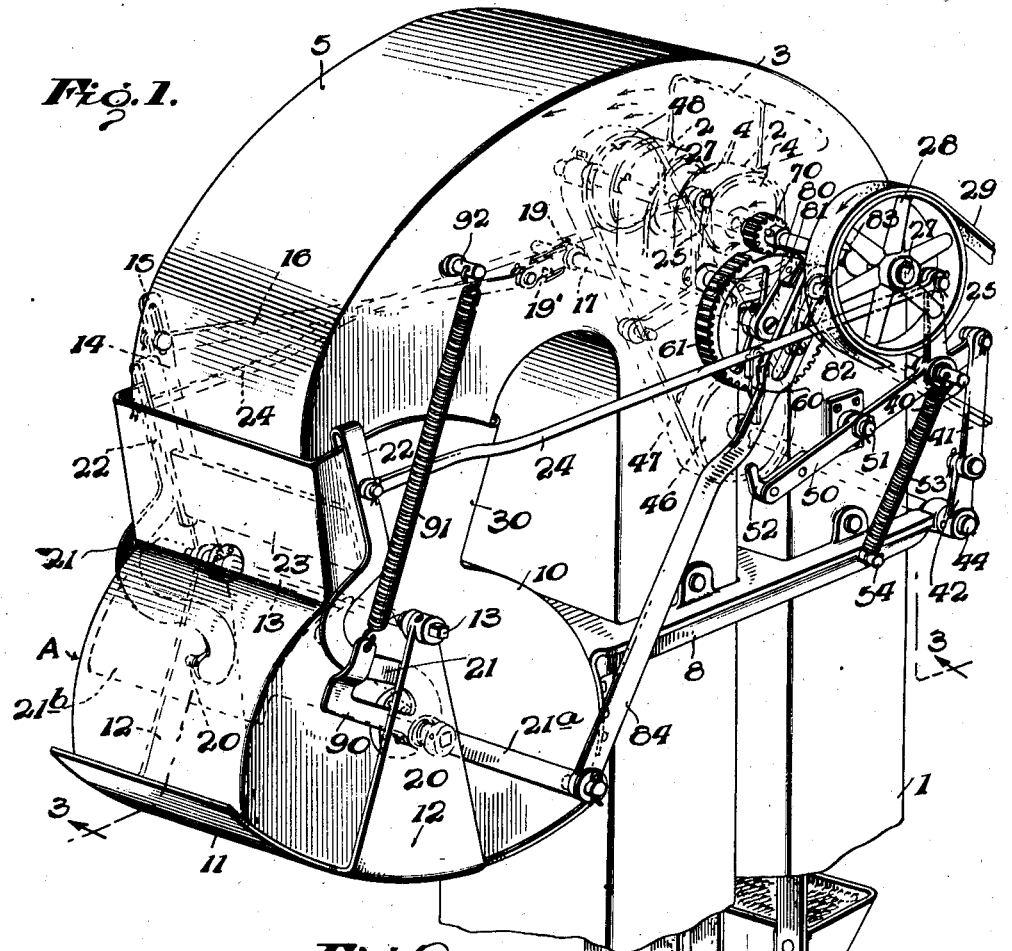
Figure 1 is a perspective view of the unit head and its associated drive elements.

As indicated above the purpose of the present invention is to provide a simple efficient structure which may be associated with a threshing machine conveyor which is automatic in operation and which functions accurately to measure predetermined quantities of grain and after such measurement to automatically discharge the grain.

The structure and function of the unit will the more readily be appreciated upon reference to the accompanying drawing.

As there shown a conveyor, indicated generally by the numeral 1, is provided with the usual endless belts 2 to which are affixed the buckets 3. The belt which is suitably driven passes over the pulley 4 (shown in Figure 3) and these buckets 3 successively discharge their contents into the chute or neck 5.

The grain passes from the neck 5 to a novel measuring unit designated generally at A.

The measuring unit comprises, so to speak, a special form of measuring valve which is automatic in operation. This unit includes a container 10 of any suitable shape which may be attached to the framing casing 8 in any suitable manner, as by means of the angle iron brackets, as shown. At its lower section container 10 is provided with a pivoted bottom or gate 11. As shown more particularly in Figure 1; the gate which is preferably arcuate in shape, is formed with the side arms 12 which are mounted at each side of the unit to the stub shafts 13 which latter are bolted to the side walls of container 10. One of the arms 12 is provided with an extension 14 which is formed with the slot 15 at its upper end. To this extension, connecting rod 16 is connected, which in turn is connected to the end of an operating shaft 17 through the link 18 and crank arm 19 fixed on shaft 17. As will be observed upon an inspection of Figure 2, connecting rod 16 is pivotally attached to link 18 which is loosely mounted on shaft 17. The crank arm 19, which is fixed to shaft 17 is formed with a lower lateral flange or lip 19' which is adapted to engage the contiguous edge of the crank. It will thus be observed that such connection insures for one way rotative motion of link 18 when the shaft 17 is rotated in a manner later to be described. As will be seen more fully hereinafter, the shaft 17 is normally stationary but when a predetermined quantity of grain fills the measuring device A it is adapted to be rotated for one revolution thereby operating to oscillate the arcuate plate or valve 11 through the transmission linkage 18—16—14 to open and closed position. As will be understood when valve 11 is opened the measured grain is discharged and when the valve 11 moves back to closed position an additional quantity of grain may be measured.

The measuring unit also includes a grain cut-off valve whose movement is synchronized with that of gate valve 11. This cut-off valve comprises an arcuate plate 21b which, as shown, is mounted for oscillatory movement in the restricted portion or throat of the measuring unit 10. Such plate extends laterally the width of the throat and is formed with the arms 21d fixed to the stub shafts 20. When the gate valve is moved to open position to discharge grain the cut-off valve is moved to closed position, in a manner to be described to cut off the flow of grain into the measuring unit.

Associated with the valve 11 and correlated with its oscillatory movement is a counter (not shown) whereby the number of unit quantities of grain passing through the measuring device may be registered.

These intermittent movements of the gate valve 11 and cut-off valve 21b are initiated automatically by the grain contained in the measuring unit A. In the operation of the present unit, as will be explained, when a predetermined amount of grain accumulates in the measuring unit a control linkage is operated so as to effect one rotation of the shaft 17 and thus to move gate valve 11 from the closed to the open and back to closed position and at the same time to move the cut-off valve 21b to the closed and open position.

As shown particularly in Figures 1, 4 and 5, the measuring unit A mounts the stub shafts 20. These shafts extend outwardly of the measuring unit at each side and have rigidly mounted thereon the arms 21A. As shown in Figure 5 the shafts 20 are rotatably mounted in the bushings 21C which in turn are supported by the brackets 21E bolted to the walls of the container 10. The brackets are formed with outer reduced journal sections on which the arms 21 are mounted for limited rotation independently of the rotation of shafts 20. As shown in Figure 4, these arms are formed at the upper end with the U shaped extensions 22 which pass down over the sides of the unit 10. Affixed to these arms and extending therebetween is a plate 23.

The stroker mechanism, as indicated hereinbefore is adapted to act as a trip or control means for the purpose of ultimately effecting oscillatory movement of the gate valve 11 and cut-off valve 21b.

As shown particularly in Figure 1, the ends of stroker connecting rods 24 are pivotally connected at one end to arms 21 and at the other ends to the rocker or bell cranks 25. The rocker arms 25 are mounted upon shaft 40. This shaft 40 is not journaled in the frame but is a vertically movable shaft. To the outer end of the short arm of the rocker or bell crank 25 is pivotally connected a link 41 which in turn is pivotally connected to the arm 42, the latter being keyed or attached to shaft 44. Shaft 44 is journaled in suitable hangers or bearings which are formed on the ends of the supporting frame 8 and has keyed thereto the pulley 46. Pulley 46 in turn is connected through the belt 47 to the pulley 48 keyed on the main drive shaft 27. The main drive shaft 27 has keyed thereon the pulley 28 which is driven from any suitable source of power by appropriate means as by the belt 29.

Associated with the stroker mechanism is a trip device. This includes the lever 50 which is pivotally mounted intermediate its ends upon the stub shaft or pivot 51 which latter may be attached to the casing by means of suitable bracket as shown. One end of the lever 50 is provided with an upstanding finger or hook 52. The other end of the lever 50 is journaled on the shaft 40 as shown. A spring 53 is attached at one end, as shown, 54 to the supporting frame 8, and at the other end is attached to the shaft 40. In the normal position of the parts, tension spring 53 tends to pull shaft 40 downwardly pivoting lever 50 about its pivot point 51 so that the finger 52 engages the projection 60 carried upon the gear 61.

Gear 61 is adapted to be intermittently operated and through suitable transmission mechanism to effect operation of the gate valve 11 and cut-off valve 21b. As shown particularly in Figure 2, gear 61 is fixed on shaft 17 and is aligned with the spur gear 70 keyed upon the main drive shaft 27. However, it is particularly to be observed, gear 61 is formed with a smooth segment 75 which, as shown in Figure 1 provides sufficient clearance so that the gear 70 may freely rotate without engaging gear 61.

Figure 2:
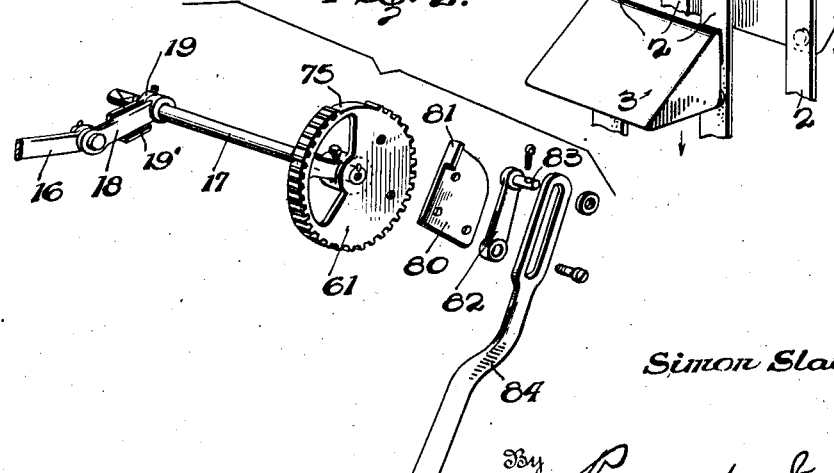
Figure 2 is a disassembled perspective view of the operating shaft and its elements.

As is illustrated in Figure 2, a plate 80 having a stop or projection 81 is adapted to be attached eccentrically to the face of gear 61. Attached to the plate 80 is the small crank 82 having the integral pin or stud 83. A connecting rod 84, as shown in Figure 2, is provided with an offset slotted end which slot engages the stud 83. The other end of connecting rod 84 is pivotally connected to the outer end of the rocker arm 21A. Arm 21A also carries an offset arm 90 to the end of which is attached the tension spring 91. The other end of this spring is attached to a suitable stud 92 secured to the casing.

From the description given thus far, it will be observed that spring 91 acting upon arm 90 and the arm 21A tends to draw connecting rod 84 downwardly and thus to close cut-off valve 21b. When such movement is unrestricted, as when the finger 52 disengages the stop 60, connecting rod 84 tends to rotate gear 61, due to the pin and slot connection, to cause the latter to engage spur gear 70. Free rotation of the gear 61 is permitted due to the elongated slot in connecting rod 84.

From the description of the several parts the operation of the device will readily be appreciated. The conveyor belts 2 with its buckets 3 are continuously driven by means of the drive pulley 28. In instituting the operation the gate valve 11 is in closed position and cut-off valve 21b is in open position. In these circumstances the clear space or untoothed sector in gear 61 is immediately below the spur gear 70 and finger 52 of lever 50 engages stop 60. As the conveyor buckets discharge their contents into the narrow mouth of the measuring unit and thence to the lower portion of the measuring unit the stroker bar oscillates back and forth across the mouth of the measuring unit. This oscillation is effected by means of the constantly rotating shaft 44, which, as previously noted, is driven from the main shaft by means of the pulley 46. As the shaft 44 rotates the arm 42 similarly rotates and due to the association of rocker shaft connections 41 and 25 the upper arm of the rocker shaft oscillates backwardly and forwardly on the free shaft 40 thus causing reciprocatory movement of the stroker plate 23.

When a predetermined quantity of grain fills the measuring unit it is evenly smoothed off and begins to build up in the narrow mouth of the unit 10 until a point is reached when the lateral or reciprocatory movement of the stroker bar 23 is chacked or restricted by the grain. In these circumstances, inasmuch as the shaft 43 continues to rotate this increased resistance forces freely moving shaft 40 upwardly against the tension of spring 53. Since lever 50 is journaled on the shaft 40 upward movement of the latter causes lever 50 to rotate about its pivot 51 and hence finger 52 disengages the stop 60. Disengagement of stop 60 allows full action of the tripping spring 91 and this latter, operating through arm 90, connecting rod 84 and crank pin 83 pulls or rotates gear 61 into meshing engagement with spur gear 70. At the same time spring 91 operating through arm 21A moves valve 21b to closed position. Gear 61 and its associated shaft 17 is consequently rotated or positively driven. Due to this rotation the linkage 16 and 18 is similarly rotated in the manner previously explained to positively displace the valve 11 synchronously with the operation of valve 21b.

As the gear 61 makes one revolution the connecting rod 16 makes one complete reciprocation thus moving gate plate 11 to open and back to closed position. As plate 11 is opened the contained predetermined quantity of grain is immediately discharged.

As will be appreciated, the parts are so designed that when plate 11 returns to fully closed position, and the cut-off valve 21b to open position the smooth sector of gear 61 is again subjacent the gear 70. At this interval in operation the grain is cleared from the container 10 and hence there is no resistance to the free reciprocation of stroker plate 23, hence spring 53 acts to retract shaft 40 and effects pivoted movement of lever 50 about stud 51 to cause finger 52 to again engage its associated stop 60.

The above described cycle of operation is repeated when the measuring unit 10 again fills.

It will be observed that the described apparatus is as simple as it is effective. Due to the simplicity and the novel arrangement of the parts the apparatus may readily be associated with the typical or usual conveyors.

It will also be appreciated that while a specific apparatus has been shown and described, this is given as illustrative of the broader concept of the novel mode of operation contemplated under the invention. The structure shown is susceptible to a wide range of modification in design and choice of equivalent or similarly functioning elements. All such modifications are comprehended within the broader concept of the invention as defined in the appended claims.

I claim:

1. A measuring device adapted for attachment to the discharge chute of a grain conveyor comprising a container having an open bottom portion and a restricted grain receiving neck; a gate plate pivotally connected to the sides of the container and adapted to be moved to one position to close said bottom portion and to another position to open said bottom portion and permit the discharge of grain therefrom; a stoker plate pivotally mounted on the container and extending across the said restricted neck and means to reciprocate the stroker plate in a horizontal plane in the neck, said means including a displaceable shaft, and a trip mechanism carrying said displaceable shaft and operable to permit movement of the gate plate to open position upon restriction of said reciprocating movement of the plate by an accumulation of grain in the said neck portion.

2. An apparatus according to claim 1 in which the trip mechanism is adapted to engage a gear wheel to effect intermittent engagement with a continuously driven gear; a shaft mounted on the conveyor connected to said intermittently driven gear and crank connection between said shaft and gate plate; a shut-off valve operable in the neck of the container, means connecting the shut-off valve and said intermittently driven gear whereby rotation of said last named shaft effects movement of the shut-off valve.

3. A measuring device adapted for attachment to the discharge chute of a grain elevator comprising a container having a neck portion of restricted cross section and a body portion of enlarged cross section forming a single measuring chamber; a stroker plate mounted for reciprocation in the neck portion; means pivotally connected to the stroker plate to effect its reciprocation; a gate valve positioned at the bottom portion of the container and adapted for pivotal movement to open and closed position; a trip mechanism including a positively driven shaft and operable upon stoppage of the stroker plate to effect operation of the valve to effect discharge of grain; a second valve operable in the container and at the base of the restricted neck portion, means connecting said second valve with the trip mechanism to effect its operation synchronously with the operation of the gate valve to shut off the flow of grain through the neck when the gate valve is in open position.

4. In a device of the character described a container, a pivoted stroker plate mounted inside the container and having offset arms attached thereto extending outside of the container, a shut off plate valve mounted inside the container adjacent the stroker plate, said shut off plate valve being pivoted on the container; transmission rods pivotally connected to each of said offset arms, a shaft, rocker arms rigidly fastened to the shaft, means to pivotally connect an end of each transmission rod to the rocker arms, said shaft being mounted on a pivoted frame and means on the pivoted frame to permit engagement and disengagement of a driving mechanism.

SIMON SLAUBAUGH.